April 14, 1970  F. B. CURTENIUS  3,505,797
HIGH SPEED GRASS MOWER
Filed March 20, 1968
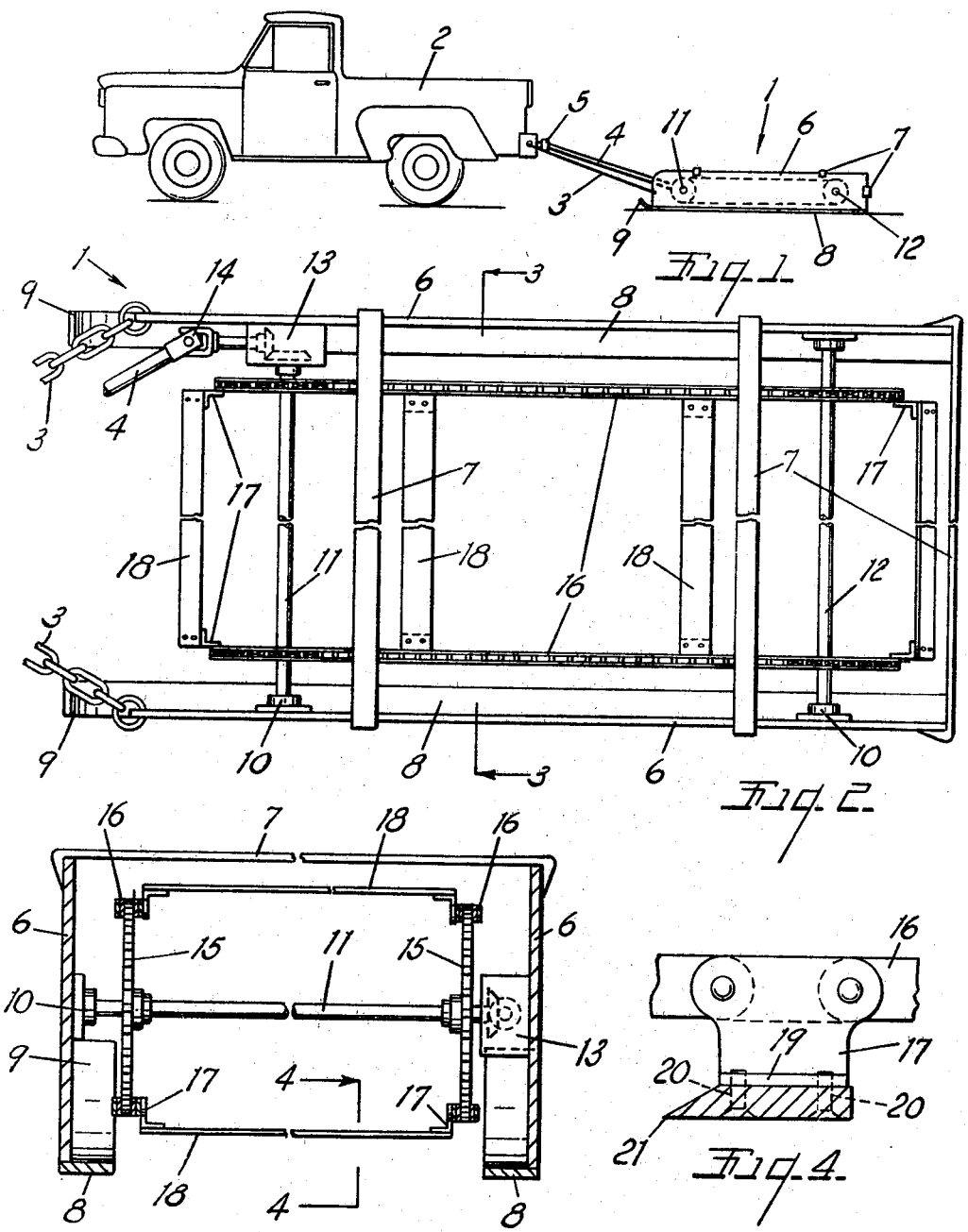
INVENTOR.
Frederick B. Curtenius
BY
ATTORNEY.

United States Patent Office 3,505,797
Patented Apr. 14, 1970

3,505,797
HIGH SPEED GRASS MOWER
Frederick B. Curtenius, 1537 Long Road,
Kalamazoo, Mich. 49001
Filed Mar. 20, 1968, Ser. No. 714,716
Int. Cl. A01d 35/00
U.S. Cl. 56—25                                          6 Claims

ABSTRACT OF THE DISCLOSURE

A frame having longitudinal side members with runners on the bottom, fore and aft cross shafts journalled with the frame, a drive connection to one shaft, laterally spaced sprockets on each shaft, chain loops trained around the sprockets on each side of the frame and plural cutter bars connected between the chains at spaced intervals, the cutter bars having sharpened cutting edges facing forwardly on the lower reaches of the chain loops.

Related applications

The apparatus disclosed herein is a variation of that disclosed in applicant's copending application, Ser. No. 574,235, now Patent 3,427,792 filed Aug. 22, 1966, for Method and Apparatus for Mowing Grass; and utilizes the same principle of high speed, rectilinear, motion of a cutter bar over the ground to cut grass.

Outline of invention

The invention substantially increases the rate or area of grass mowed, with decreased danger from high speed centrifugal force in cutter parts, and debris thrown off by the cutter. One or more straight cutter bars are advanced broadside around a closed circuit by supporting chain loops. A frame having skids or other ground engaging parts supports the chains and cutter bars with the bars in spaced relation above ground level along the lower reaches of the chains. The frame may be towed or self-propelled, and a drive connection from a suitable power source is connected to drive the chain loops so that the lower reaches of the chains advance the cutter bars in the same direction as the motion of the frame. The speed of the cutter bars over the ground is thus the sum of the speeds of the vehicle and the speed of the chains.

The drawings of which there is one sheet illustrate a highly practical form of the invention.

FIGURE 1 is a side elevational view of the mowing apparatus operatively connected to a towing vehicle.

FIGURE 2 is an enlarged fragmentary top plan view of the mower.

FIGURE 3 is a fragmentary transverse vertical cross sectional view taken along the plane of the line 3—3 in FIGURE 2.

FIGURE 4 is an enlarged fragmentary cross sectional view through one of the cutter bars showing the connection thereof to the supporting chain loops.

The mower of the invention generally indicated at 1 may be towed as illustrated or provided with a special self propelling vehicle. In the example illustrated, a light pickup truck 2 is provided with towing connections 3 to the mower and a drive connection from the engine of the truck to the mower is provided through a shaft 4 from a power take off on the truck conventionally illustrated at 5.

The mower consists of a generally rectangular frame having flat upright side members 6 connected by suitable cross members 7. Runners 8 connected along the lower edges of the side members have upturned forward ends 9 to slide the frame along the surface of the ground. If desired, wheels, not illustrated, or other supporting means for the frame may be provided.

Rotatably supported between the side members 6 as by suitable bearings 10 are a forward cross shaft 11 and a rear cross shaft 12. One end of the front cross shaft 11 is supported in a gear box 13 secured to the right side member and from which a universal joint or other drive connection 14 projects for drivingly connecting the power take-off shaft 4 to the front cross shaft 11.

Each of the cross shafts 11 and 12 is provided with a pair of laterally spaced sprockets 15 which rotatably and drivingly support a pair of laterally spaced chain loops 16. Selected links of the chain loops 16 are provided with connecting clips 17 on their opposed inner sides which support the ends of a plurality of cutter bars 18 at spaced intervals around the chain loops. Various means for connecting the cutter bars to the chains may be provided. In the example illustrated the clips 17 have flanges 19 to which the ends of the cutter bars are secured by screws 20. The cutter bars are relatively heavy and rigid so as not to sag materially in the center and are provided with a sharpened cutting edge 21 which is faced forwardly along the lower reaches of the chain loops.

The mower is designed to operate over partially graded ground such as the shoulders and medians of divided highways and along golf courses. Light weight vehicles such as pickup trucks may operate safely at speeds of 30 to 40 or more miles per hour over these surfaces and if the drive connection 4 to the chain loops 16 is designed as intended to operate the chain loops at a substanttial lineal speed, it will be apparent that the cutter bars 18 will be moved at high speeds across the surface of the ground. The cutter bars thus function to cut grass by impact as much as by slicing action and will satisfactorily cut grass and weeds even though the leading edges 21 may become relatively dulled.

By way of example, if the sprockets 15 are about one foot in diameter, and if the power take-off 5 and gear box 13 rotate the shaft 11 at about 1200 r.p.m., the lineal speed of the cutter bars will be the equivalent of over 42 m.p.h. If the truck 2 travels at 40 m.p.h. at this speed of the cross shaft, the forward cutting speed of the bars relative to the ground will be about 82 m.p.h., or somewhat over 120 ft. per second. This is more than ample to cut grass with the edges 21 only reasonably sharpened or tapered. With blades sharpened to a knife edge, a forward speed of 20 m.p.h. is sufficient to cut grass, but since a relatively fast rate of cut or forward speed of the vehicle is desired, slower rotational speeds of the chains 16 and duller edges 21 are permissible.

The mower is safe to operate at the speeds intended because any stones, trash or debris picked up from the ground by engagement with the cutter bars will be thrown directly forwardly to be stopped by engagement with the rear of the towing truck rather than being broadcast indiscriminately as by rotary mowing blades. Vegetation which tends to cling to the cutter bars is thrown off by centrifugal force as the bars travel around the spockets. Shields (not shown) may be used to deflect such thrown off material.

What is claimed as new is:

1. Apparatus for cutting vegetation comprising a frame having longitudinally extending side members, flexible supporting members arranged in laterally spaced upright loops and supported by said side members, at least two cutter bars having their ends connected to said supporting members and extending transversely therebetween, said cutter bars having a cutting edge faced forwardly of the frame on the lower reaches of said supporting members, means for supporting said frame from the ground with the lower reaches of the supporting members above the ground, means to advance said frame along the ground, and drive means connected to rotate said supporting members in their loops with the lower reaches of the loops moving forwardly relative to said frame.

2. Apparatus as defined in claim 1 in which there are more than two cutter bars connected in spaced relation around said loops.

3. Apparatus as defined in claim 2 in which said supporting members are chains trained around sprockets supported from said side members, one pair of sprockets being connected by a cross shaft, and said drive means being connected to said cross shaft.

4. Apparatus as defined in claim 3 in which said means for advancing said frame is a towing connection to a powered vehicle, and in which said drive means is a power take-off connection from the engine of the vehicle.

5. Apparatus as defined in claim 1 in which said means for supporting said frame comprises ground engaging skids connected to said side members and located therebelow.

6. Apparatus as defined in claim 1 in which the combined rates of speed of said supporting members and said means for advancing said frame is in excess of 20 m.p.h.

References Cited

UNITED STATES PATENTS

| 57,082 | 8/1866 | Cadwell | 56—294 XR |
|---|---|---|---|
| 1,823,219 | 9/1931 | Vimtrup | 56—294 XR |
| 2,669,083 | 2/1954 | Hinson | 56—294 |
| 3,005,301 | 10/1961 | Sammarco | 56—25 |

RUSSELL R. KINSEY, Primary Examiner

U.S. Cl. X.R.

56—289